United States Patent [19]

Denommee et al.

[11] 3,956,447

[45] May 11, 1976

[54] METHOD OF MAKING DEEP DRAWN, LAMINATED ARTICLES

[75] Inventors: Maurice R. Denommee, Franklin; Jack F. Furrer, Wayland; Lawrence R. McManus, Lynn; Philip E. Durand, Hudson, all of Mass.

[73] Assignee: The United States of America as represented by the Secretary of the Army, Washington, D.C.

[22] Filed: June 16, 1975

[21] Appl. No.: 587,517

[52] U.S. Cl. ........................................ 264/135; 2/6; 156/224; 156/228; 264/137; 264/258
[51] Int. Cl.² .......................................... B29D 9/10
[58] Field of Search .......... 264/135, 136, 137, 258; 156/224, 228; 2/6

[56] References Cited
UNITED STATES PATENTS

| | | | |
|---|---|---|---|
| 2,532,442 | 12/1950 | Daly | 156/224 X |
| 2,956,916 | 10/1960 | Voss | 156/224 X |
| 3,018,210 | 1/1962 | Frieder | 156/228 X |
| 3,582,990 | 6/1971 | Frieder | 2/6 |
| 3,878,035 | 4/1975 | Gils | 264/137 X |

*Primary Examiner*—Richard R. Kucia
*Attorney, Agent, or Firm*—Nathan Edelberg; Robert P. Gibson; Charles C. Rainey

[57] ABSTRACT

A method of making a deep drawn, laminated, non-metallic article having high ballistic resistance and having a smooth edge which comprises, preparing a preform comprising a plurality of superimposed patterns of aromatic polyamide fabric impregnated with a thermoplastic or thermosetting resin, then either (a) trimming the preform to form a peripheral edge thereon so as to allow for application of additional resin in a suitable form to the peripheral edge during the final molding of the preform, applying the additional resin to the peripheral edge of the trimmed preform, and finish molding the article accompanied by flow of the additional resin about the peripheral edge to produce a smooth edge on the final molded article, or (b) applying an epoxy resin film on the outer surface of the preform, or on the superimposed patterns prior to making the preform, around the periphery of the preform or superimposed patterns and overlapping the line around the periphery of the preform on which cutoff occurs in the finish molding step, and finish molding the article, the finish molding being accompanied by cutoff and flow of the epoxy resin over the edge produced by cutoff to produce a smooth edge on the final molded article.

12 Claims, No Drawings

METHOD OF MAKING DEEP DRAWN, LAMINATED ARTICLES

The invention described herein may be manufactured, used, and licensed by or for the Government for governmental purposes without the payment to us of any royalties thereon.

BACKGROUND OF THE INVENTION

This invention relates to a method of making deep drawn, laminated, non-metallic articles having high ballistic resistance, and more particularly deep drawn, laminated, non-metallic, ballistic-resistant helmets.

In the field of body armor, and more particularly in the production of ballistic-resistant helmets, it has been traditional to rely on metals or metal alloys to provide protection for the head against ballistic missiles and shell fragments or secondary fragments. Metals, however, while providing the required degree of protection, in general have inherent disadvantages, especially weight, and thermal and electrical conductivity. Studies have been conducted with the objective of producing a non-metallic system which will be at least equal to the metallic helmets of the prior art in protective properties and which will be lighter and have other advantages as well. Lightweight ballistic-resistant helmets and helmet liners have been produced from laminates of such non-metallic materials as nylon ballistic cloth, needle-punched nylon felt, woven roving fiber-glass fabric, and polycarbonate sheet. Resin-bonding of a plurality of laminae of such materials has also been employed. More recently, relatively new aromatic polyamides, one of which known as "Kevlar" is manufactured and sold by E. I. duPont de Nemours & Co., have shown greater ballistic resistance than other konw non-metallic materials and have proven to be approximately equivalent on a weight basis to ballistic steel in ballistic-resistant helmets and also in body armor. These materials in the form of fabrics woven from relatively heavy yarns have been impregnated with resins and molded by compression molding to produce ballistic-resistant helmets. However, use of aromatic polyamides in the making of helmets has proven to be quite expensive, not only because they are relatively new materials, but also because of their inherent tendency to resist shearing, which makes conventional molding operations difficult and expensive, particularly when a cutoff or pinchoff element is employed in forming the edges of helmets, which is the conventional molding practice. The dulling action of "Kevlar" fabric greatly reduces the number of deeply drawn items which can be produced by conventional procedures before renewal of the cutting edges of the mold is required. In addition, even though cutoff may occur, the edges of the deep drawn items are usually fibrillated to a great extent, producing a stubbled edge of such nature that a special edge finishing procedure is required in order to produce a smooth edge on the molded ballistic-resistant item.

It is, accordingly, an object of the invention to provide a method of making a deep drawn, laminated, non-metallic fabric-containing article having high ballistic resistance, the edges of the article being made smooth and substantially free of fibrillation of the fabric or yarn components.

Another object is to provide a method whereby a ballistic-resistant helmet comprising substantial quantities of aromatic polyamide fabric may be produced by molding a resin-impregnated aromatic polyamide fabric without leaving fibrillated aromatic polyamide fibers exposed along the edges of the helmet.

Other objects and advantages will appear from the following description, and the novel features will be particularly pointed out in connection with the appended claims.

SUMMARY OF THE INVENTION

The invention comprises a method of making a smooth edged, deep drawn, laminated, non-metallic fabric-containing article having high ballistic resistance, the article comprising a high proportion of aromatic polyamide fibers having a high modulus which are not cut off smoothly at the edges of the article in a conventional mold provided with cutoff or pinchoff elements. The method comprises the preparation of a preform comprising a plurality of superimposed plies or patterns of aromatic polyamide fabric impregnated with a thermoplastic or thermosetting resin, either (a) trimming the preform on a bandsaw, or by other means, so as to allow for application of additional resin as a film or deposited from a solution or as a resin hoop or resin-impregnated rope to the peripheral edge of the trimmed preform during or just before the finish molding of the preform, applying the additional resin, as stated, or the resin-impregnated rope, to the peripheral edge of the trimmed preform, and finish molding the article, or (b) not trimming the preform, but applying additional resin, particularly an epoxy resin film to the outer surface of the preform so as to overlap the line around the periphery of the preform on which cutoff occurs in the mold in the finish molding of the article, and finish molding the article; in either of these procedures the finish molded article has a smooth, non-fibrillated edge which does not require additional processing or treatment to smooth the edge as did the prior art aromatic polyamide fabric-containing deep drawn articles, such as ballistic-resistant helmets.

DESCRIPTION OF THE PREFERRED EMBODIMENT

The ballistic-resistant material used in preparing the preform from which the final deep drawn, laminated article is produced in a finish molding operation is a resin-impregnated fabric prepared from woven ballistic-resistant fabric made of heavy denier, high tenacity, aromatic polyamide yarns of the type known as "Kevlar" yarns, which is impregnated with a solution of a polyvinyl butyral modified phenolic resin and dried to remove the solvent prior to the cutting of patterns therefrom. A predetermined number of such patterns cut in a generally star shape, i.e., in the general configuration shown in Military Specification MIL -L-41800E, Liner, Ground Troop's Helmet (Combat), dated June 4, 1974, in FIG. 3, is superimposed on one another. The arms of the star-shaped patterns are rotated in successive layers of the patterns so that partial overlapping occurs and that the spaces cut out between the arms of the star-shaped patterns are covered by portions of succeeding superimposed layers and that the effective number of layers of fabric in the final molded article will be somewhat greater in the areas near the perimeter of the stack of superimposed patterns as well as in the areas near the perimeter of the preform produced therefrom. The several patterns are tacked together to prevent slippage during handling, particularly during the placement of the stack of patterns on the male element of the mold and the closing of the mold. The tacking may be accomplished by application of a small amount of solvent to the patterns at selected points, or by application of small amounts of adhesive at selected points, or by other means. The stack of tacked-together patterns thus formed may be subsequently handled according to either of two different procedures.

In one procedure, the stack of tacked-together patterns is placed in a deep draw mold comprising male and female elements and is heated therein to about 125°–150°F. and subjected to a force of about 300 tons. As soon as the force reaches 300 tons, the mold is opened. The patterns are found to be consolidated and adhered together essentially in the shape which is desired for the final deep drawn article, but with a small portion of the layers extending beyond the limits of the desired final edge, this portion not having been subjected to the heat or pressure and, therefore, hardly being adhered together or consolidated at all, in contrast to the layers exposed to the heat and pressure within the mold. This preform is thereafter trimmed by means of a bandsaw or by other suitable cutting means independent of the mold so as to produce a peripheral edge on the preform, whereby the preform assumes the general contour desired in the final deep drawn article but lacks by from about 0.001 inch to about 0.25 inch throughout its periphery extending as far as the desired final edge is intended to extend. The trimmed preform may then be prepared for final molding according to one of several alternative procedures. In one such procedure an epoxy resin film having a thickness of about 5 to 25 mils, preferably about 15 mils, is lapped over the trimmed peripheral edge of the preform so that it extends far enough up on the inner and the outer surfaces of the preform and around the periphery of the preform to overlap the line where the edge of the article is formed by the cutoff. The film is adhered to the surfaces of the preform by spot welding at selected points with a heat gun or by use of an adhesive or a small amount of solvent to form a channel of epoxy resin film in which the peripheral edge rests. In another such procedure, a solution of a suitable resin is brushed on the preform, overlapping the peripheral edge. Sufficient such resin coating is appled so that, upon drying to remove solvent and finish molding, the resin will fill the space in the mold which would have been left vacant due to the trimming of the preform, in the absence of the resin coating material. In yet another procedure a hoop formed of a thermoplastic or thermosetting resin of suitable cross-section and bulk may be placed in the mold around the peripheral edge of the trimmed preform when finish molding is carried out, the resin from the hoop filling the space around the peripheral edge of the article and being welded to the trimmed peripheral edge of the preform. The dimensions of such a hoop will depend on the volume requiring filling, which in turn depends on how much of the preform is trimmed off prior to the finish molding operation. In yet another procedure a rope of suitable size, preferably made of nylon or hemp or fiberglass impregnated with a resin solution from which the solvent is removed, is placed in the mold around the peripheral edge of the trimmed preform when finished molding is carried out. For such a procedure, however, it is desirable to carry out the finish molding in a mold which has a recess around the periphery thereof of dimensions adequate to accommodate the rope while it is being welded to the edge of the article in the finish molding operation.

With any of the above-described procedures for providing additional resin to form the edge of the article around the periphery thereof, the finish molding is carried out by returning the deep drawn preform, which has been trimmed and then provided with additional resin in a suitable form, to the deep draw mold, closing the mold, heating the mold to about 330°F. and, bringing the force applied up to about 300 tons for about two minutes, then degassing by raising the female element of the mold, allowing substantially all trapped gases to escape from the preform, then reclosing the mold and restoring the temperature to about 330°F. and the force applied to about 300 tons and holding that force and temperature for about 10 minutes more to complete the finish molding operation. The mold is then opened and the deep drawn article is removed. It has a smooth, non-fibrillated edge requiring no further finishing or treatment. In some cases, there may be a slight excess of the resin. If so, this is readily cut off cleanly by the cutoff of the mold, leaving a smooth edge.

In another procedure, after the preform has been prepared as described above, instead of trimming off the substantially unadhered and unconsolidated portions of the layers extending beyond the limits of the desired final edge and a little more to provide space for the introduction of additional resin along and about the edge as described above, the preform is maintained untrimmed but is prepared for the finish molding step by applying an epoxy resin film such as that described above to the outer surface of the preform, the film being adhered to the preform in the portion thereof where cutoff occurs in the mold during the finish molding step. This is done so that when the mold is closed to the extent of accomplishing cutoff, the epoxy resin film will overlap the line around the periphery of the plurality of preform patterns at which cutoff occurs and also so that the epoxy resin will flow over and about the edge of the article and produce a smooth, non-fibrillated edge. Normally, in molds employed for making ballistic helmets, the clearance between the cutting edges is about 0.003 inch. The rheological characteristics of the epoxy resin selected for this purpose are such as to cause the epoxy resin to flow very slightly if at all during the degassing step, but to be in a substantially gel state then, and to flow well during the finish molding, after degassing, so as to coat any rough edge which, in the absence of the epoxy resin, might result from the resistance of the aromatic polyamide yarns and filaments to cutting by the cutoff of the mold. The epoxy resin also flows to both sides of the edge and melds with the adjacent inner and outer surfaces of the finish molded article.

Degassing is the removal of substantially all gases from a preform during the first stage of the finish molding in a compression molding procedure. After the preform has been heated substantially to the temperature at which finish molding is to be carried out in the compression mold, the pressure on the preform in the mold is reduced to atmospheric pressure for a sufficient length of time to allow substantially all trapped gases to escape from the preform. Thereafter, the mold pressure is reapplied and increased sufficiently to complete the compression molding while maintaining the temperature required for finish molding the article. The degassing avoids the formation of trapped pockets of gas in the final molded article with resulting weaknesses in the article.

In yet another procedure, epoxy resin film may be applied to the stack of patterns, preferably after they have been tacked together, the epoxy resin film being adhered or spot-tacked to the top pattern around the circumference thereof in such width and such a manner that the epoxy resin film overlaps or straddles the line around the plurality of preform patterns and of the deep draw preform along which cutoff occurs in the deep draw mold during the finish molding step, or during the formation of the preform, if desired. This places the epoxy resin film on the outer surface of the stack of patterns and the outer surface of the preform. Ultimately, in the finish molding step, the epoxy resin flows over the edge when cutoff occurs and along the outer and inner surfaces of the finish molded article, producing a smooth edge, free of fibrillation since any rough edge which might have been produced at cutoff of the aromatic polyamide yarns in the mold in the absence of the epoxy resin is coated with the epoxy resin, which melds with the adjacent inner and outer surfaces of the finish molded article. A similar result may be produced by applying an epoxy resin coating of suitable width and thickness around the circumference of the topmost pattern in the stack of tacked-together preform patterns prior to placing the stack of patterns in the mold. If this procedure is followed, either with epoxy resin film or epoxy resin coating, it is not necessary to remove the preform from the deep draw mold after formation of the preform, but the process may be carried through to completion with proper timing and control of the heating and application of force in the mold to the production of the finish molded article having a smooth edge.

The aromatic polyamide fabric employed in preparing the deep drawn, laminated, non-metallic articles of the invention may take numerous different forms. For example, the fabric may be a 2×2 basket weave fabric weighing about 0.44 kg per $m^2$ or 13 oz per $yd^2$ woven from 167 tex (1500 denier) "Kevlar" yarn in a 35×35 count. Such a fabric is impregnated with a polyvinyl butyral modified phenolic resin dissolved in a mixture of methanol and ethanol applied to the extent of about 20–24% by weight pickup of the solids from the polyvinyl butyral modified phenolic resin solution. After being impregnated, the fabric is dried, depositing the solids within the interstices of the fabric. The polyvinyl butyral modified phenolic resin solution may have a composition such as that shown in Table 1.

posed patterns so as to increase the number of layers of resin-impregnated fabric in that area to be substantially equivalent to the effective number of layers in the portion of the resulting preform and final helmet in which overlapping of portions of the arms of the star-shaped layers or patterns occurs. In this mannere, for example, starting with 16 relatively star-shaped patterns prepared with the abovedescribed 0.44 kg per $m^2$ fabric made of "Kevlar" yarn, a preform and the final helmet would comprise 19 effective layers in the overlapping areas. Hence, it is desirable to superimpose 3 layers over the central portion of the stack of patterns where overlapping does not occur, thus providing 19 actual layers in that portion of the helmet. Thus, upon being placed in the mold so that the patterns overlap and cover spaces formed in the individual patterns by the cutting and as a result of being pressed within the deep draw mold at a moderately elavated temperature, such as 125°–150°F., and at a force of about 300 tons, a preform is produced which is of approximately equal thickness and density at all points and which upon being finish molded produces a "Kevlar" helmet having a density of about 38 oz per $ft^2$ of surface throughout the helmet. As soon as the 300 tons force is attained, the mold is opened and the preform is removed. The patterns are found to have become adhered together and somewhat consolidated in the form of a laminated structure having essentially the shape of a helmet but having a small portion of the layers extending beyond the limits of the desired final edge, this portion not having been subjected to the heat and pressure and, therefore, hardly being adhered together or consolidated at all, in contrast to the layers exposed to the heat and pressure within the mold. The preform is then trimmed by means of a bandsaw so as to produce a peripheral edge having the general contour desired in the final helmet but lacking by about one-sixteenth inch throughout its periphery extending as far as the desired final edge is to extend. The peripheral edge is then either covered with a suitable resin film or coated with a solution of a suitable resin, e.g., a polyvinyl butyral modified phenolic resin, such as that of Table 1, to provide a coating of about one-sixteenth inch thickness when dried. The coating is dried on the peripheral edge before finish molding a helmet. If film is used, an epoxy resin film, such as 3M Adhesive AF-110-Weight B, having a width of 3 inches, a thickness of about 0.015 inch, and a weight of about 0.08 lb./$ft.^2$, manufactured by Minnesota Mining & Manufacturing Co., St. Paul, Minn. is applied to the peripheral edge and is

TABLE 1

| Components | Parts by weight | Percent of total solids |
|---|---|---|
| Polyvinyl butyral (18–20% hydroxyl) | 868.0 (25% solids in ethanol) | 47.2 |
| Phenol formaldehyde | 100 (57% solids in ethanol) | 12.4 |
| Trimethylol phenol | 267 (60% solids in ethanol) | 34.8 |
| Phthalic anhydride | 25.6 | 5.6 |
| Methanol | 51.2 | — |
| Totals | 1311.8 | 100.0 |

When a ballistic-resistant helmet is being made, uniformity of ballistic resistance is usually desired over the entire outer surface of the helmet. In such a case, it is desirable to superimpose one or more laminae of the resin-impregnated fabric, cut to a suitable outlined shape, on the central portion of the stack of superimposed on both the inner and the outer surfaces of the preform about 1½ inches and is adhered to the preform surfaces by means of a suitable adhesive or is thermally tacked to the preform surfaces. Thus, the epoxy resin film forms a channel about the peripheral edge of the preform. The preform is then returned to the mold; the mold is closed; the temperature is raised to about 330°F. and the force applied in the mold is brought up to about 300 tons and held at that level for about 2 minutes. The female element of the mold is then raised to allow degassing of the preform to take place. Then the mold is reclosed and the force is restored to about 300 tons while maintaining the temperature at about 330°F. for about 10 minutes more to complete the molding operation. The mold is then opened and the helmet is removed, cooled, and found to have a smooth, non-fibrillated edge which requires no further finishing or treatment. This is in marked contrast to "Kevlar" helmets of the prior art in the making of which the "Kevlar" fabric was cut off in the mold without the provision of suitable additional resin to flow over the edge and produce a smooth edge on the finish molded helmet.

The fabric used for making a ballistic-resistant helmet may also be an eight harness satin weave fabric weighing about 0.17 kg per $in^2$ or 5 oz per $yd^2$ woven from 44 tex (400 denier) "Kevlar" yarn in a 28×28 count. Such a fabric is impregnated with a polyvinyl butyral modified phenolic resin composition such as that shown in Table 1 above to the extent of about 30–34% by weight pickup of the solids from the polyvinyl butyral modified phenolic resin solution. After being impregnated, the fabric is dried, depositing the solids within the interstices of the fabric. The impregnated and dried fabric is cut into star-shaped patterns and 60 such patterns are superimposed with overlapping as previously described and 10 or 11 layers of the impregnated and dried fabric cut to a suitable shape are superimposed over the central portion of the stack of patterns where overlapping of the star-shaped patterns does not occur. Then the entire superimposed stack is placed in a deep draw mold and formed into a preform in a manner substantially like that described above with respect to the heavier "Kevlar" fabric. The preform is removed from the mold and trimmed in a manner similar to that applied to the preform from the heavier "Kevlar" fabric; and the peripheral edge of the preform is either covered with epoxy resin film, as described above, or sufficient additional resin is provided by one of the other procedures described above to produce a smooth edge during the finish molding operation. The trimmed preform together with the additional resin is returned to the mold and finish molding is carried out in substantially the same manner as that employed with the preform prepared using the heavier "Kevlar" fabric. The final molded helmet product has a smooth edge and requires no further finishing or treatment.

The aromatic polyamide fabrics employed in the invention are, in general, prepared from yarns made from polyamides produced by condensation polymerization of aromatic diamines, e.g., paraphenylene diamine, with aromatic dicarboxylic acids, e.g., terephthalic acid, or derivatives of such diamines and dicarboxylic acids which react to produce polyamides. However, they may be made by polymerization of para-aminobenzoic acid or derivatives thereof. Other aromatic polyamides or aromatic polyamide-hydrazides may also be used. In general, those materials which have been found to provide the best ballistic-resistant characteristics in helmets have exhibited high moduli, e.g., moduli in the range of from about 300 to about 750 grams per denier or possibly even higher moduli. "Kevlar" apparently belongs to this class of materials, although the exact structure and chemical composition thereof is not known to applicants. It is thought by some authors to be obtained by the polymerization of paraphenylene diamine or a derivative thereof with terephthalic acid or a derivative thereof, the product being designated as poly (1,4 phenylene terephthalamide). (See G. S. Fielding-Russell, Text. Res. J., 41, 861 (1971) and W. B. Black, J. Macromol. Sci, Chem. A7, 3ff (1973). The important aspect of the invention is that it provides a method for overcoming the rather serious problem of fibrillation of fabrics made of polymeric materials having high moduli used in the manufacture of molded articles, especially deep drawn articles, wherein such fabrics are impregnated with thermoplastic or thermosetting resins to adhere the fabrics together and to impart stiffness to the final molded product plus a desirable degree of resistance to transient deformation, i.e. deformation that occurs without penetration by a missile.

Other thermoplastic or thermosetting resins may be employed for impregnating the aromatic polyamide fabric and thus binding the laminae of aromatic polyamide fabric together sufficiently to reduce transient deformation of the ballistic-resistant helment to a low level.

Other thermoplastic or thermosetting resins may also be brought into close association with the peripheral edge of the preform when trimming of the preform is carried out to provide sufficient additional resin to flow over the edge of the article and produce a smooth edge.

If desired, separate molds may be employed for production of the preforms and for the finish molding operation. The life expectancy of the cutoff edges of the molds may exert an important influence in determining whether to employ separate molds for producing preforms from the molds used for finish molding the articles.

The present invention provides the advantages over the prior art method of making deep drawn, laminated, non-metallic articles, such as ballistic-resistant helmets made from aromatic polyamide fabrics, of preventing rapid dulling of cutoff or pinchoff elements of deep draw molds and also of rendering unnecessary an aftertreatment of the edges of the deep drawn articles to produce smooth edges. It provides a more economical process for making such articles since the molds required for making such articles are very expensive and shutdown time required for replacing the cutoff elements or for sharpening such elements, plus the labor involved, increase the costs of the prior art procedure to unacceptably high levels for large scale production of deep drawn articles prepared using aromatic polyamide fabrics.

The invention is highly useful in the production of ballistic-resistant helmets, particularly for use by the Armed Forces, but also is useful in the production of any type of deep drawn article comprising aromatic polyamide fabrics or fabrics made from yarns having high moduli as reinforcing elements thereof.

It will be understood, of course, that various changes in the details and materials which have been described in order to explain the nature of the invention, may be made by those skilled in the art within the principle and scope of the invention.

We claim:

1. Method of making a deep drawn, laminated article having a smooth edge, said article formed of a plurality of laminae of woven fabric composed of aromatic polyamide yarns impregnated with sufficient resin to cause said laminae to adhere together, said aromatic polyamide yarns having a tendency to form a stubbled edge on said article when trimmed to form the peripheral edge thereof, comprising the steps of:
   a. impregnating a woven fabric composed of aromatic polyamide yarns with a resin mixture comprising a first thermoplastic or thermosetting resin and a volatile solvent,
   b. removing said volatile solvent from the impregnated fabric by evaporation to form a resin-impregnated and solvent-free fabric,
   c. preparing a plurality of preform patterns from said resin-impregnated and solvent-free fabric, said patterns being cut in a generally star shape,
   d. superimposing said plurality of preform patterns on each other, said patterns being overlapped sufficiently to provide an effective number of thickness of said resin-impregnated and solvent-free fabric greater than the actual number of patterns in the final molded article over a large portion of said article,
   e. tacking said plurality of preform patterns together in overlapping stage,
   f. placing the tacked superimposed patterns on the male element of a deep draw compression mold,
   g. deep draw molding said tacked superimposed patterns with the assistance of the female element of said mold and low heat and pressure to produce a deep drawn preform having a preliminary edge,
   h. removing said deep drawn preform from said mold,
   i. applying a second resin along that portion of said preform which is to comprise the peripheral edge of the preform, said second resin being thermoplastic or thermosetting and in a sufficient quantity and having rheological characteristics at the temperature and pressure at which finish molding is carried out which cause said second resin to flow over and about said peripheral edge of said preform, and
   j. finish molding said deep drawn preform to produce said article with a smooth finish peripheral edge formed thereon by said second resin.

2. Method according to claim 1, wherein between said step h. and said step i. said deep drawn preform is trimmed to produce said peripheral edge thereon.

3. Method according to claim 2, wherein said second resin is an epoxy resin film adhered over said peripheral edge of said deep drawn preform, said epoxy resin film extending along the inner and outer surfaces of said preform from about ½ inch to about 2 inches from said peripheral edge.

4. Method according to claim 2, wherein after said trimming said peripheral edge is coated with a solution of said second resin and the solvent is evaporated from the coating on said peripheral edge.

5. Method according to claim 2, wherein in said step i. a hoop formed of said second resin is placed in close association with said peripheral edge.

6. Method according to claim 2, wherein in said step i. a rope impregnated with said second resin is placed in close association with said peripheral edge.

7. Method according to claim 6, wherein said rope is made of fibers of materials selected from the group consisting of nylon, hemp, and fiberglass.

8. Method according to claim 1, wherein prior to said step j. an epoxy resin film is adhered to the outer surface of said deep drawn preform so as to overlap the line to become the peripheral edge of said deep drawn preform and wherein cutoff occurs in said mold in said step j.

9. Method according to claim 1, wherein between said step e. and said step f. an epoxy resin film is adhered to the outer surface of said plurality of preform patterns so as to overlap the peripheral edge to be formed when cutoff occurs in said mold.

10. Method of making a deep drawn, laminated, ballistic-resistant helmet having a smooth edge, said helmet formed of a plurality of laminae of woven fabric composed of aromatic polyamide yarns impregnated with sufficient resin to cause said laminae to adhere together, said aromatic polyamide yarns having a tendency to form a stubbled edge on said helmet in the final molding step employing a deep drawing mold, comprising the steps of:
   a. impregnating a woven fabric composed of aromatic polyamide yarns with a resin mixture comprising a first thermoplastic or thermosetting resin and a volatile solvent,
   b. removing said volatile solvent from the impregnated fabric by evaporation to form a resin-impregnated and solvent-free fabric,
   c. preparing a plurality of preform patterns from said resin-impregnated and solvent-free fabric, said patterns being cut in a generally star shape,
   d. superimposing said plurality of preform patterns on each other, said patterns being overlapped sufficiently to provide and effective number of thicknesses of said resin-impregnated and solvent-free fabric greater than the actual number of patterns in the final molded helmet over a large portion of said helmet,
   e. superimposing on said plurality of preform patterns at least one additional lamina of said resin-impregnated and solvent-free fabric shaped so as to cover that portion of said final molded helmet in which no overlapping of said patterns occurs to produce a helmet of constant thickness,
   f. tacking said plurality of preform patterns togeter in overlapping state and said additional lamina of said resin-impregnated and solvent-free fabric superimposed on said plurality of preform patterns,
   g. placing the tacked superimposed patterns and said additional lamina on the male element of a deep draw compression mold,
   h. deep draw molding said tacked superimposed patterns and said additional lamina with the assistance of the female element of said mold and low heat and pressure to produce a deep drawn preform having a peripheral edge,
   i. removing said deep drawn preform from said mold,
   j. applying a second resin along the peripheral edge, said second resin being thermoplastic or thermosetting and in a sufficient quantity and having rheological characteristics at the temperature and pressure at which finish molding is carried out which cause said second resin to flow over and about peripheral edge of said preform, and
   k. finish molding said deep drawn preform to produce said helmet with a smooth finish peripheral edge formed thereon by said second resin.

11. Method according to claim 10, wherein said first resin is a polyvinyl butyral modified phenolic resin.

12. Method according to claim 11, wherein said impregnated and solvent-free fabric comprises from about 20 to about 34 percent by weight of said polyvinyl butyral modified phenolic resin.

* * * * *